United States Patent
Chen et al.

(10) Patent No.: US 12,389,054 B2
(45) Date of Patent: Aug. 12, 2025

(54) REPRESENTATION PARAMETER ADJUSTMENT USING SEPARATE MODELS

(71) Applicant: HULU, LLC, Santa Monica, CA (US)

(72) Inventors: Qingying Chen, Beijing (CN); Hanqi Wang, Beijing (CN); Dingming Wu, Beijing (CN); Chunyang Wei, Beijing (CN); Xiaohui Xie, Beijing (CN)

(73) Assignee: HULU, LLC, Santa Monica, CA (US)

( * ) Notice: Subject to any disclaimer, the term of this patent is extended or adjusted under 35 U.S.C. 154(b) by 610 days.

(21) Appl. No.: 17/657,261

(22) Filed: Mar. 30, 2022

(65) Prior Publication Data

US 2023/0291946 A1     Sep. 14, 2023

Related U.S. Application Data

(63) Continuation of application No. PCT/CN2022/080078, filed on Mar. 10, 2022.

(51) Int. Cl.

| | |
|---|---|
| *G06Q 30/02* | (2023.01) |
| *G06Q 30/0201* | (2023.01) |
| *G06Q 30/0251* | (2023.01) |
| *G06Q 30/0601* | (2023.01) |
| *H04N 21/25* | (2011.01) |
| *H04N 21/81* | (2011.01) |

(52) U.S. Cl.
CPC ....... *H04N 21/251* (2013.01); *G06Q 30/0201* (2013.01); *G06Q 30/0254* (2013.01); *G06Q 30/0631* (2013.01); *H04N 21/8126* (2013.01)

(58) Field of Classification Search
CPC ............. H04N 21/251; H04N 21/8126; G06Q 30/0201; G06Q 30/0254; G06Q 30/0631
See application file for complete search history.

(56) References Cited

U.S. PATENT DOCUMENTS

2021/0065064 A1*    3/2021    Xu ...................... G06F 18/2113

OTHER PUBLICATIONS

University of Chicago, "Too Many Metrics" (Year: 2016).*

* cited by examiner

*Primary Examiner* — Breffni Baggot
(74) *Attorney, Agent, or Firm* — Kwan & Olynick LLP

(57) ABSTRACT

In some embodiments, a method receives a line item factor for a line item at a first model. The method receives a competition factor at a second model. The first model generates a first value for a representation parameter based on the line item factor. The representation parameter is used to generate a representation for estimating selection of the instance of supplemental content for the line item for delivery. The second model generates a modification factor based on the competition factor. The modification factor is configured to modify the first value for the representation parameter based on competition from other line items to select the instance of supplemental content for the line item for delivery. The method modifies the first value for the representation parameter using the modification factor to generate a second value for the representation parameter where the second value is used to generate the representation.

20 Claims, 6 Drawing Sheets

REPRESENTATION PARAMETER ADJUSTMENT USING SEPARATE MODELS

CROSS-REFERENCE TO RELATED APPLICATIONS

This application is a continuation of, and claims priority to, co-pending International Application No. PCT/CN2022/080078 by CHEN et al., titled REPRESENTATION PARAMETER ADJUSTMENT USING SEPARATE MODELS, filed on Mar. 10, 2022, which is hereby incorporated by reference in its entirety and for all purposes.

BACKGROUND

In video delivery, videos may be delivered to user accounts. Also, within the videos, instances of supplemental content may also be delivered by a request processing system. In some examples, a main content provider may enter into agreements with individual supplemental content providers to delivery supplemental content. The agreements are referred to as line items where each line item specifies associated requirements for delivering an instance of supplemental content. For example, the requirements may define targeting requirements, delivery goals, and pacing requirements. The targeting requirements may indicate characteristics of user accounts that qualify to receive the instance of supplemental content. The delivery goal is the desired number of times the instance should be delivered during the specified time period. The pacing requirements describe the rate of delivery in which the instance of supplemental content should be delivered during the time period. For example, a line item may wish to target adults between the ages of 21 to 35 as targeting rules, require that the supplemental content be displayed 50 million times to this group as a delivery goal, and be delivered evenly throughout a time period as the pacing constraints. Other types of agreements may also exist that do not have one or of the above requirements, or have other requirements.

In some examples, the delivery system uses the requirements to select and deliver instances of supplemental content when receiving requests for supplementation content. Depending on requirements of the line items, different instances of supplemental content may be delivered to different user accounts. The processing of requests is dynamic and unpredictable in that the characteristics of user accounts that request supplemental content and the line items that are selected may not be predictable. Accordingly, it may be difficult to estimate how instances of supplemental content will be delivered for line items.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
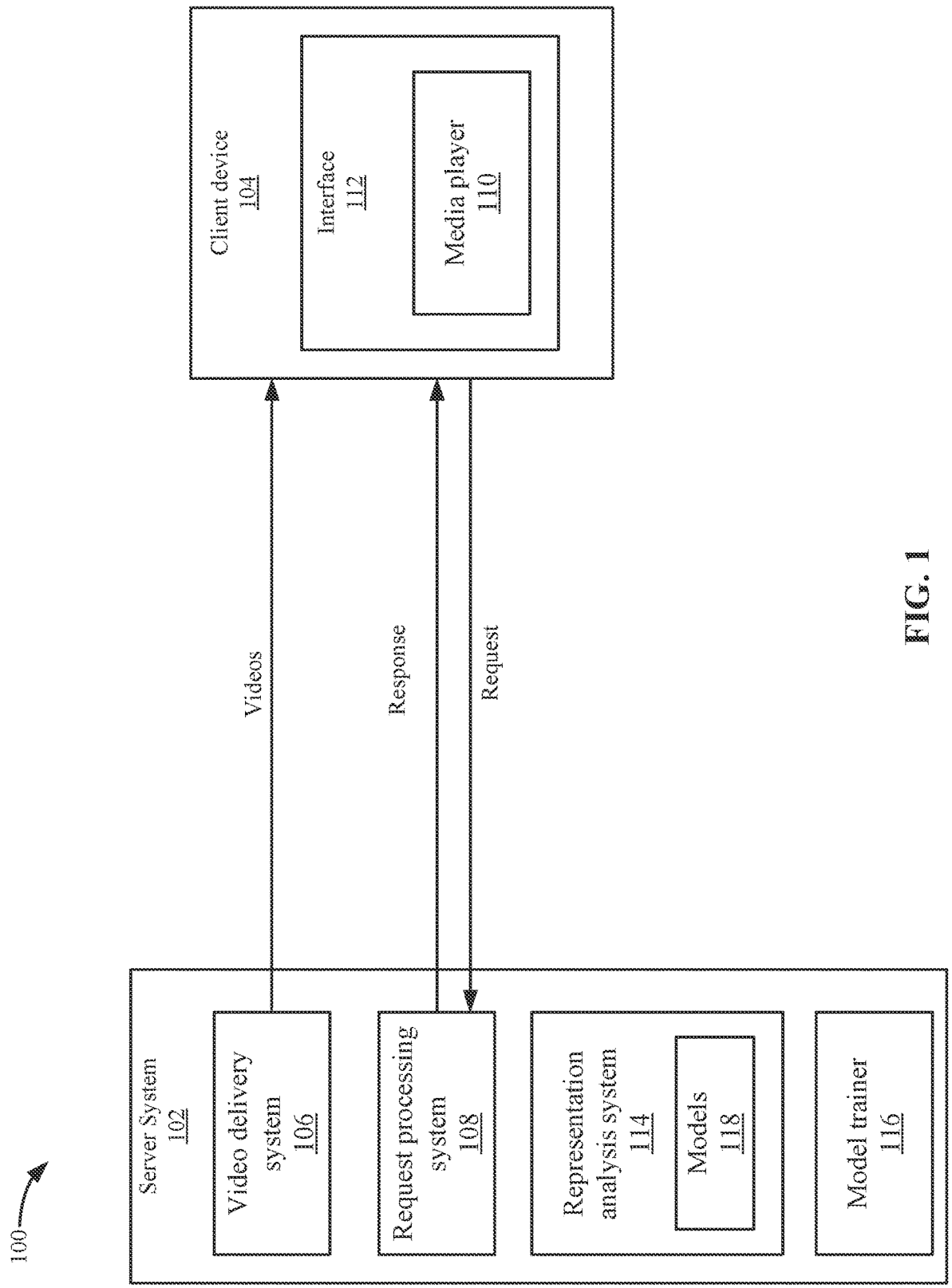
FIG. 1 depicts a simplified system for generating a representation according to some embodiments.

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system generates a representation using values for representation parameters that are generated for a line item. The representation may estimate the effectiveness of the delivery of supplemental content for a line item. In some embodiments, the representation may represent the reach of the line item, which may be the number of distinct entities (e.g., user accounts) in which a respective instance of supplemental content for the line item is delivered. This type of representation may be referred to as a reach representation. Although a reach representation may be used as an example, other representations may be appreciated. In some embodiments, the representation may be defined by a function, which may form a line, curve, or other relationship between user accounts and the delivery of instances of supplemental content for the line item. The function may be changed based on the desired relationship for the representation. The reach representation may help providers of a line item to adjust the settings of the line item, such as the delivery goal or targeting requirements based on the reach of the instance of supplemental content. The estimation of the reach representation may be difficult due to different factors, such as the dynamic nature and unpredictability of the request processing system. That is, it is hard to predict which user accounts will watch which videos in a video delivery system, and which instances of supplemental content will be selected for delivery to the user accounts.

The system may use a novel configuration of models to generate values for the representation parameters of the representation. For example, two separate models are used to generate the values for the representation parameters of the representation. The values of the representation parameters may define the form of the representation. In the system, a first model may generate estimated values for the representation parameters of the representation. Then, a second model may generate modification factors that may be used to adjust the estimated values for the representation parameters. The adjusted values for the representation parameters may be used to generate the representation.

The structure of the system that is used to generate the adjusted parameters may be an improvement over conventional systems. For example, a single model may not use modification factors, but would be trained to generate the parameter values directly. In the present system, logic for the second model is separate from the logic of the first model. That is, the logic of the second model that is used to generate the modification factors is not included with the logic of the first model that is used to generate the estimated values for the representation parameters. The separation of the logic may improve the training process of the first model and the second model to be more efficient and faster as will be discussed in more detail below. Also, by having two separate models, the logic for the generation of the adjusted values for the representation parameters and the logic to generate the modification factors may be different compared to if a single model is used to generate the values for the representation parameters of the representation. For example, conventionally, a single model has logic that is trained to generate the values for the representation parameters of the representation. The present system may generate the values for the representation parameters faster because the logic of the first model and the second model may be more efficient when executed separately compared to logic that generates values for the representation parameters in a single model. Also, single model may not generate the adjustment factors; rather, the single model generates the outputs based on the inputs, and the outputs are not modified.

System Overview

FIG. 1 depicts a simplified system 100 for generating a representation according to some embodiments. System 100 includes a server system 102 and a client device 104. Although a single instance of server system 102 and client device 104 is shown, multiples instances will be appreciated. For instance, server system 102 may include multiple servers or other computing devices to provide the functionality described herein. Also, system 100 may include multiple client devices 104 that interact with server system 102.

Server system 102 may include a video delivery system 106 that delivers videos to client devices 104. In some embodiments, video delivery system 106 may use a content delivery network (CDN) (not shown) to deliver the videos. The videos may be associated with main content, which is content that is requested by a user account associated with client device 104. For example, a user account may request a movie, an episode of a show, etc. Although videos are described, it will be understood that other content may also be delivered as the main content, such as a website, page of content, etc.

Client device 104 may be a computing device, such as a smartphone, living room device, personal computer, tablet, television, set-top box, etc. Client device 104 may include an interface 112 that may display the main content, such as videos. For example, a media player 110 may play back a video that is requested from video delivery system 106. A user account may use client device 104 and may be associated with video delivery system 106 (e.g., the user account signs up for the service). Also, video delivery system 106 may store characteristics for the user account, such as an age of a user, watch history, etc.

At some point during a break in the main content, which may be referred to as an opportunity, such as during a break in the video or when a page is displayed, a request processing system 108 may select instances of supplemental content to deliver to client device 104. An instance of supplemental content may be different from the main content, such as the supplemental content may not have been originally requested by client device 104 as compared to the request for the main content. An example of supplemental content may be an advertisement that is displayed during a break in the main content. Request processing system 108 may detect when supplemental content should be displayed. For example, during the main content, a break may occur in which one or more instances of supplemental content should be displayed, which may be referred to as an opportunity. In other embodiments, supplemental content may be displayed on a site, such as a web page, simultaneously with the main content that a user account is viewing. It will be understood that supplemental content may be displayed in different scenarios.

In some embodiments, request processing system 108 may communicate with other devices or modules to determine the instance of supplemental content to display. For example, request processing system 108 may receive a list of line items that have instances of supplemental content that are eligible to be displayed during a break. The list may be based on different factors, such as targeting rules that match the characteristics of the user account or may be any line items that are available for that break. When the line item is selected, server system 102 sends an instance of supplemental content for the line item to client device 104. Client device 104 may then display the instance of supplemental content. The display of the instance of supplemental content may form an impression, which is when an instance of supplemental content is displayed to the user account.

A representation analysis system 114 generates a representation, such as a reach representation. In some embodiments, representation analysis system 114 includes models 118 that are used to generate values for the representation parameters of the representation. Models 118 may be trained to generate the values for the representation parameters. Models 118 may be trained before any instances of supplemental content are delivered for a line item, after instances of supplemental content are delivered for the line item, or in real-time while instances of supplemental content for the line item are being delivered.

A model trainer 116 trains models 118. For example, as will be discussed in more detail, a first model may be trained while the outputs of a second model are fixed. Then, the model parameters of the first model may be fixed while the second model is trained. This simplifies the training process compared to training a single model that attempts to generate values for the representation parameters of the representation because the logic of the first model and the second model may be simplified when separating the models. Accordingly, the separation of the models allows the training process to be performed more efficiently and faster.

In some embodiments, a first model may generate estimated values for the representation parameters of the representation that are based on line item-specific information. A second model may generate modification factors that are based on competition factors between line items during the selection process of selecting a line item for a request. The modification factors are then used to adjust the values of the estimated values for the representation parameters, which result in adjusted values for the representation parameters. Representation analysis system 114 then uses the adjusted values for the representation parameters to generate the representation. Determining the modification factors for value of parameters may be performed faster than attempting to determine the values for the representation using the line item-specific information and the competition factors as inputs into a single model because the separation of logic in the first model and the second model may determine the modification factors and the parameter values faster. The following will now describe the overall process of generating the representation.

Representation Generation

Figure 2A:
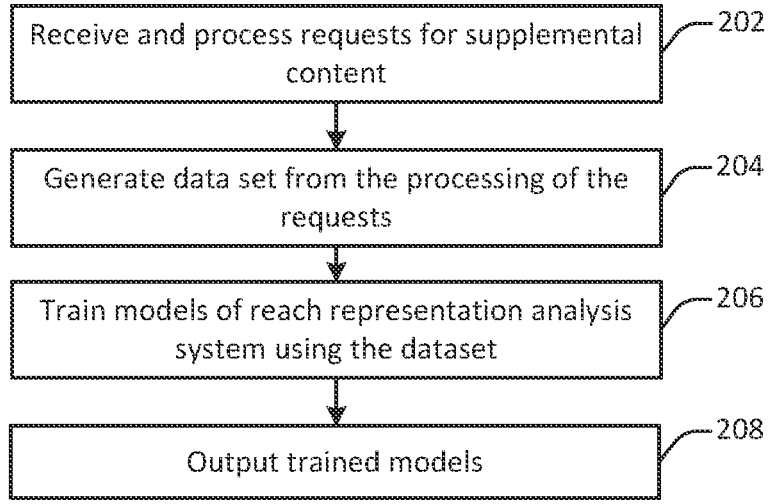
FIG. 2A depicts a simplified flowchart of a method for training models of a reach analysis system according to some embodiments.

FIG. 2A depicts a simplified flowchart 200 of a method for training models 118 of representation analysis system 114 according to some embodiments. Representation analysis system 114 may train models 118 that can be used to generate representations for multiple line items. Also, representation analysis system 114 may train models for specific line items. At 202, server system 102 receives and processes requests for supplemental content. For example, as described above, request processing system 108 may receive requests for supplemental content during the playing of videos. Request processing system 108 may deliver instances of supplemental content that are selected for the request, such as based on characteristics of the user account that sent the request and characteristics of the line item. This process may be performed before the representation for a line item is delivered or after delivery has started.

At 204, representation analysis system 114 generates a data set from the processing of requests. The data set may include information associated with the request, such as the user account characteristics. If the data set is generated before delivery starts for the line item, the data set does not include any information for delivery of instances of supplemental content for this specific line item. Also, the data set may include competition information, which may model the competition among line items to be selected for a request. In some embodiments, the competition information may include which line items qualified to be selected for a request. This may model the competition among line items because the line items that qualify for the request compete with each other to be selected for the request. Other competition information may also be used, such as which line item is selected for a request over the other line items.

At 206, representation analysis system 114 trains models 118 using the data set. The training may adjust values of model parameters in models 118. Values for model parameters may be adjustable in logic of the models that perform respective calculations to generate values for representation parameters. The training will be described in more detail below. At 208, representation analysis system 114 outputs the trained models 118 for use in generating a representation for line items.

Once the model parameter values for models 118 have been trained, representation analysis system 114 can generate values for the representation parameters for line items. The values for the representation parameters may generate a representation form, which may be different based on different values for the representation parameters.

The representation may be generated at different times, such as for line items with historical delivery information or for new line items that have not had instances of supplemental content delivered before. One advantage of being able to generate a representation for new line items is the representation can be generated without requiring historical delivery data for the specific line item. Previously, historical data may have been needed when using interpolation or extrapolation techniques to estimate the representation. That is, the interpolation or extrapolation adjusts the historical delivery data from the specific line item. However, in an improvement, representation analysis system 114 is configured to not require historical delivery data to generate a representation for a line item because the training of models 118 may be able to generate values for representation parameters based on line item-specific information and not historical delivery data for the line item. This may be useful when new line items are being used, and the representation can be generated to evaluate different settings for the new line items.

Figure 2B:
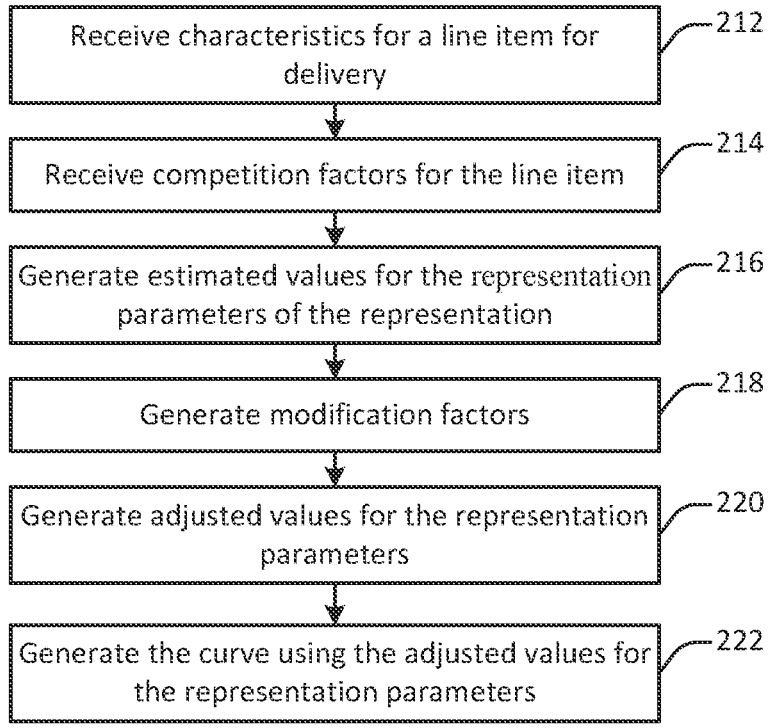
FIG. 2B depicts a simplified flowchart of a method for generating a representation according to some embodiments.

FIG. 2B depicts a simplified flowchart 210 of a method for generating a representation according to some embodiments. At 212, representation analysis system 114 receives characteristics for a line item that define requirements for delivery of instances of supplemental content to user accounts. Characteristics for a line item may be associated with that line item. For example, the characteristics may include targeting rules, a line item duration, an industry of the provider of the line item, delivery rules, etc. The delivery rules may be frequency caps, which limit the number of impressions per user account in a time period. The delivery rules may also be the delivery goal of the line item.

At 214, representation analysis system 114 receives competition factors for the line item. The competition factors may model the competition environment for the line item. The competition factors may be global factors that may be different from the characteristics for the line item, which are specific to the line item. The competition factors may be based on the delivery of multiple line items. For example, competition factors may be global sell-through rates, targeting specific sell-through rates, and priority. The global sell-through rate measures a ratio between demand and supply of inventories in a specific time period. The inventories are the available impressions in which an instance of supplemental content can be delivered and displayed. The demand may be based on the number of available line items that are available for impressions. The targeting specific sell-through rate measures a ratio between demand and supply of inventories with specific targeting in a specific time period. The priority describes the order of selection of line items, such as when inventory is scarce and competition is high. That is, when there is not enough inventory to deliver all the required line items, a line item with a higher priority may be selected more often.

At 216, representation analysis system 114 generates estimated values for the representation parameters of the representation based on the characteristics for the line item. As will be disclosed below in FIG. 3, a first model may generate the estimated values for the representation parameters of the representation. At 218, representation analysis system 114 generates modification factors based on the competition factors. As will be discussed below in FIG. 3, a second model may generate the modification factors. The modification factors are used to adjust the estimated values for the representation parameters. Then, at 220, representation analysis system 114 generates the adjusted values for the representation parameters by adjusting the estimated values for the representation parameters using the modification factors.

Once the adjusted values for the representation parameters are determined, at 222, representation analysis system 114 generates the representation using the adjusted values for the representation parameters. The adjustment of the estimated values for the representation parameters instead of using the initial estimated values for the representation parameters to generate the representation improves the representation generation process. For example, the estimated parameters may not be as accurate as the adjusted values for the representation parameters. In some examples, the adjustment of the estimated values for the representation parameters using the modification factors may model the competition in the system, which provide a better prediction of the reach representation. That is, request processing system 108 does not select a line item without competition occurring, and the modification factors better represent the selection process of a line item when competition is involved in the selection process. The following describes examples where the competition factors impact the estimation of reach. For line items with a higher priority, these line items may have a higher chance to be delivered to user accounts that do not watch videos very frequently, and thus do not encounter that many chances to deliver instances of supplemental content. Thus, the line items with higher priority may have more reached user accounts given their higher priority, especially with other settings are fixed. This competition may be modeled. Also, when the sell-thru rate (STR) is high (for both global STR and targeting specific STR), the demand for instances of supplemental content is high compared with the supply of line items, which is a case of intense competition. In such a scenario, it is more difficult for line items to compete to have respective instances of supplemental content delivery to user accounts. This means the line items may tend to reach fewer user accounts if competition is modeled. The above examples of competition may be modeled using the second model while interpolation and/or extrapolation methods do not consider the competition factors.

Reach Representation Analysis System

Figure 3:
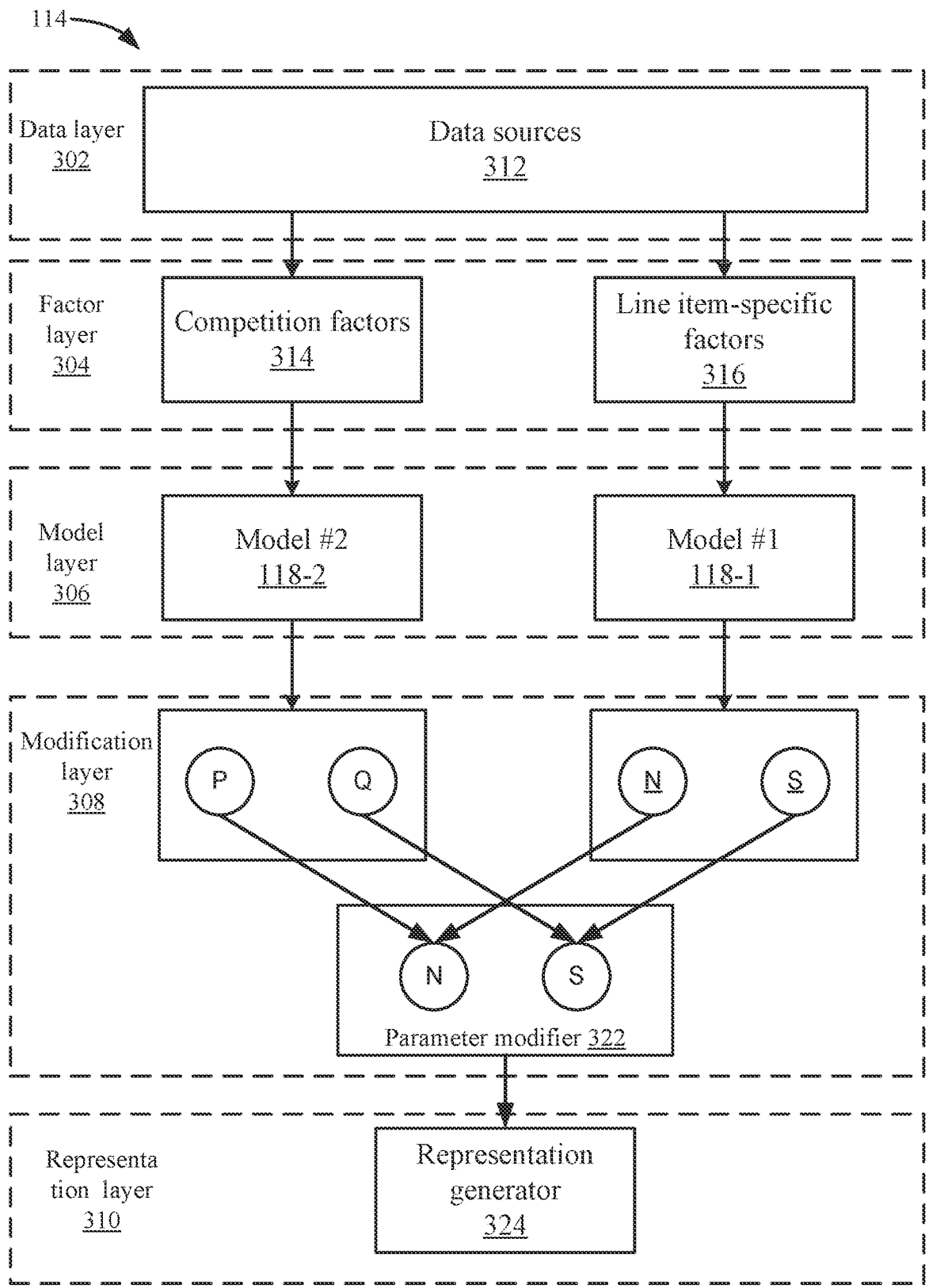
FIG. 3 depicts a more detailed example of a reach representation analysis system according to some embodiments.

FIG. 3 depicts a more detailed example of representation analysis system 114 according to some embodiments. Representation analysis system 114 may include different layers, such as a data layer 302, a factor layer 304, a model layer 306, a modification layer 308, and a representation layer 310. Data layer 302 may define the data that is used to perform the generation of the representation. Factor layer 304 may define the factors that are used as input for the models. Model layer 306 may include models 118, such as a model #1 118-1 and a model #2 118-2. Modification layer 308 generates modification factors and modifies estimated values for the representation parameters. Representation layer 310 then generates a representation using the adjusted values for the representation parameters.

Data layer 302 retrieves data from data sources 312. Data sources 312 may be generated from different sources. For example, the data may be historical data from the delivery of instances of supplemental content for line items. Also, the data may include real-time data from the delivery of line items. For example, as instances of supplemental content are delivered, data sources 312 may be updated.

The data from data sources 312 may be organized as competition factors 314 and line item-specific factors 316. As discussed above, competition factors may be based on multiple line items and line item-specific factors 316 are specific to a line item. Competition factors 314 are input into model #2 118-2 and line item-specific factors 316 are input into model #1 118-1.

Model #1 118-1 may include logic that may implement a function that receives item-specific factors 316 as inputs and outputs estimated values for the representation parameters, such as using representation parameters $\underline{N}$ and $\underline{S}$. Model #1 118-1 may implement different functions that include model parameters. For example, model #1 118-1 may be a deep neural network (DNN), a multi-output regression tree, a multi-variable linear regression function, etc. The values of the model parameters change the output of model #1 118-1 based on the input. For example, if a DNN is being used, values for weights of nodes in the DNN may be values for the model parameters.

The estimated values for the representation parameters are unadjusted values for the representation parameters that are based online item-specific factors 316, and not competition factors 314. The representation parameters that are generated may be based on the representation function. The representation function may describe the reach of the delivered impressions for a line item to the number of distinct user accounts in which the line item is reached. For example, a representation may be drawn on a graph where the Y axis is the number of distinct user accounts and the X axis is the number of delivered impressions. In some embodiments, the representation may be a function of: $x(t; N, S)=N*t/(t+S)$, where x is reach, t is the delivery impression goal, and N and S are unknown representation parameters to be estimated. In some embodiments, the parameter N determines a maximum of reachable user account size. For example, when the parameter t is infinite, the reach x is equal to the value of the parameter N, which means the reach x is the maximum number of reachable user accounts. The parameter S determines how fast the representation approaches the maximum number of reachable user accounts. For example, when the parameter t is equal to the value of the parameter S, the reach x is equal to N/2. The derivative of the reach x with respect to t is $x'(t)=N*S/(t+S)^2=N/S/(t/S+1)^2$, which is close to N/S when the impression goal t is small. Thus, when the parameter S is smaller, the representation approaches the maximum number of reachable user accounts faster. Other forms are also applicable and there is no restraint on the type of representation or the representation parameters that are used.

Model #2 118-2 may include logic that may implement a function that receives competition factors 314 as an input and outputs modification factors, such as modification factors P and Q. Model #2 118-2 may implement different functions. For example, model #2 118-2 may be a prediction network, such as a deep neural network (DNN), a multi-output regression tree, a multi-variable linear regression function, etc. Similar to above with respect to model #1 118-1, the values of the model parameters change the output of model #2 118-2 based on the input. Model #2 118-2 may determine a modification factor P and a modification factor Q. Although modification factors P and Q are described, other modification factors may be determined. The modification factors P and Q may model the impact of competition factors for respective representation parameters. For example, the modification factor P models competition for the representation parameter N and the modification factor Q models competition for the representation parameter S. In some examples, line items with higher priority may have higher chances to be delivered to user accounts that do not watch many videos, which means the modification P is likely to be higher (e.g., greater than 1) and/or modification factor S is likely to be smaller than 1. This may represent the competition for representation parameters N and S that are generated based on line items with a higher priority.

The modification factors may be generated based on the number of estimated parameters. In some embodiments, a modification factor for each estimated parameter may be generated. In other embodiments, a modification factor may be applied to more than one estimated representation parameter. Also, some estimated values for the representation parameters may not be modified.

In modification layer 308, the modification factors P and Q are received along with the estimated values for the representation parameters $\underline{N}$ and $\underline{S}$. Then, a parameter modifier 322 modifies the estimated values for the representation parameters $\underline{N}$ and $\underline{S}$ using the modification factors P and Q, respectively. The modification may adjust the value of the estimated representation parameter. The change in the estimated representation parameter may be based on the competition that a line item may experience against other line items in the selection process for requests. In some embodiments, the following modification may be performed by separately applying the modification factors P and Q:

$$N = \underline{N} * P, \text{ and}$$

$$S = \underline{S} * Q.$$

In the above, the modification factor P modifies estimated representation parameter $\underline{N}$ (e.g., by multiplication) based on the competition that is modeled for the line item that affects the representation parameter $\underline{N}$. Also, the modification factor Q modifies the estimated representation parameter $\underline{S}$ (e.g., by multiplication) based on the competition that is modeled for the line item that affects the representation parameter S. Other modifications may also be performed, such as by adding the modification factors to each respective estimated representation parameter.

Representation generator 324 then generates the representation using the adjusted values for the representation parameters. For example, representation generator 324 may apply the adjusted values for the representation parameters N and S to the representation function of $x(t; N, S) = N*t/(t+S)$. The function generates a reach impression representation that is based on line item-specific factors and competition factors.

In one example of generating a representation, for a line item with a higher priority, the line item may have a higher chance to be delivered to user accounts that do not watch videos very frequently. That is, there are fewer chances to deliver an instance of supplemental content to a user account that does not watch very many videos and not many line items will reach this user account. Thus, the line item with a higher priority will have more reached user accounts given other settings are fixed. This means that the line item may have a larger value for N and/or smaller value for S due to competition for the long-tail user accounts.

In another example, when the sell-through rate (STR) is high (for both global STR and targeting specific STR), the inventory demand is high compared with inventory supply, which is a case of intense competition. In such a scenario, it is more difficult for line items to compete for inventories from long-tail users. This means the line item may tend to reach fewer user accounts, and have a smaller value for N and/or a larger value for S due to competition when inventory demand is high compared with inventory supply.

The following will now describe the training of representation analysis system 114, which may be performed optimally due to the structure of the system that is used to generate the representation, such as the separation of model #1 118-1 and model #2 118-2.

Training

Figure 4:
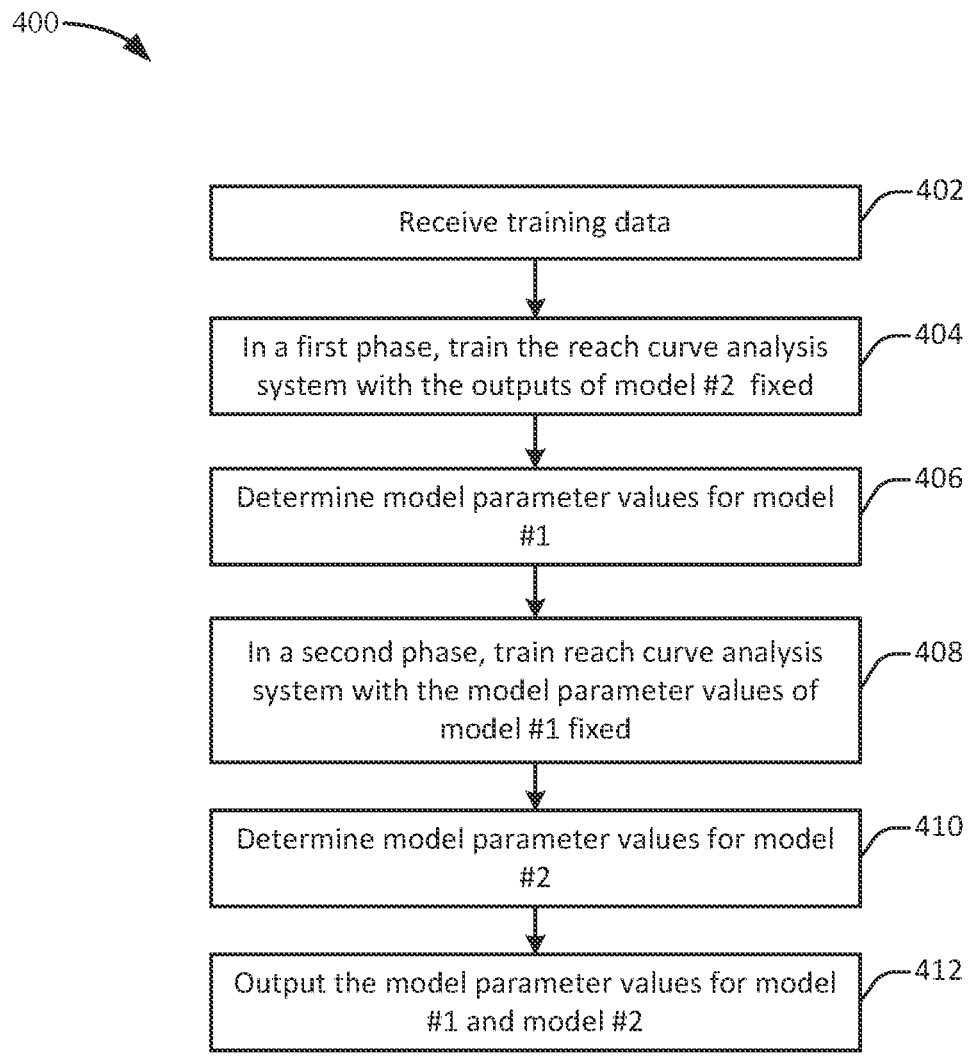
FIG. 4 depicts a simplified flowchart for training model #1 and model #2 according to some embodiments.

FIG. 4 depicts a simplified flowchart 400 of a method for training model #1 118-1 and model #2 118-2 according to some embodiments. The objective of the training may be to train the models in an efficient manner, which may be performed faster compared to if the logic for both models was combined together. In some embodiments, the training objective may be to minimize a function $L(r, r')$, where r is the final reach, r' is the estimated reach when the impression is the final impression for a line item, and L can be squared error $(r'-r)^2$, absolute error $|r'-r|$, absolute percentage error $|(r'-r)/r|$, or other error measurements. The final impression may be the number of impressions that are reached, such as 100 million impressions are fulfilled during the duration of the line item. The training may adjust model parameters to minimize the error.

At 402, model trainer 116 receives training data. The training data may be historical delivery data for a set of line items. Each line item may have line item-specific factors, competition factors, final impression statistics, and final reach statistics. For example, the final impression statistics may indicate how many impressions were encountered during the time period for the line item and the final reach statistic is how many user accounts were reached during the time period. An example data set for T items may be:

Line item #1: targeting=(age range is 20-50 years and gender is "F"), duration=30 days, industry=technology, frequency cap=3 times per user per day, . . . , global sell-through rate=0.8, targeting specific sell-through rate=0.7, priority=1, . . . , final impression=100M, final reach=40M.

Line item #T: targeting=(age range is 30-55 years), duration=60 days, industry=retail, frequency cap=4 times per user per day, . . . , global sell-through rate=0.9, targeting specific sell-through rate=0.8, priority=2, . . . , final impression=150M, final reach=60M In the above, the line items may have different targeting characteristics, such as the age range may be different in the line items and line item #1 includes a targeting characteristic for a female. The duration is different in that line item #1 ran for a duration of 30 days and line item #T ran for a duration of 60 days. The industry is the field in which the line item is related, such as technology for line item #1 and retail for line item #2. The frequency cap is the number of times the user account can be shown the instance of supplemental content, such as three times per day for line item #1 and four times per day for line item #2. Then, competition factors may be included, such as a global sell-through rate, a targeting-specific sell-through rate, etc. The competition factors may be different based on the time period in which the line items were active and which impressions the respective line items qualified for selection. Finally, a final impression and a final reach for each specific line item is included. The final impression is 100 million impressions for line item #1 and 150 million impressions for line item #T. The final reach is 40 million user accounts for line item #1 and 60 million user accounts for line item #T.

In the following, a two-phase training process is used that improves the speed at which the training can be performed and also the accuracy of the trained models. For example, at 404, in a first phase, model trainer 116 trains the entire system with the outputs of model #2 118-2 fixed. That is, model #2 118-2 may output a fixed value for the modification factors P and Q, such as a value of "1". The value of "1" when multiplied by the estimated values for the representation parameters may not change the estimated values for the representation parameters during the training process in the first phase. Other fixed values may also be used for the output. By fixing the output of model #2 118-2, the goal is to let model #1 118-1 learn to estimate the estimated values for the representation parameters without considering any competition. In this example, the parameters $\underline{N}$ and $\underline{S}$ are used to generate the representation. A supervised representation value from the supervised data is also generated. Then, the estimated representation and the supervised representation are compared to determine the error between the two representations, such as the difference between the two representations. The supervised representation is the true value that should be output as the representation. The error is then used to adjust the model parameters of model #1 118-1 to predict estimated values for the representation parameters that could reduce the error. The training process may end when the error meets a threshold, such as the error is less than a threshold.

Based on the error, at 406, model trainer 116 determines model parameter values for model #1 118-1. The logic of model #1 118-1 may use the model parameter values to generate the estimated values for the representation parameters. The model parameters values may be adjusted based on the error. For example, different methods may be used to determine values that reduce the error.

At 408, in a second phase, model trainer 116 trains the system with the model parameters of model #1 118-1 fixed. In this case, the model parameter values that are determined in the first phase are fixed and not adjusted in the second phase. It is noted that this is different than fixing the outputs of model #1 118-1. Depending on the input of item-specific factors, the output of model #1 118-1 may change during the training process in the second phase. However, the values of model parameters of model #1 118-1 are not changed during the second phase.

At 410, model trainer 116 determines model parameter values for model #2. For example, model #2 is trained to learn how to modify the estimated values for the representation parameters based on the competition factors. In some examples, the modification factors are generated from model #2 118-2, which are used to adjust the values of the estimated values for the representation parameters. Then, the estimated representation is generated using the adjusted values for the representation parameters. The estimated representation is compared to the supervised representation based on the supervised data. The error between the two representations is then used to determine how to adjust the model parameter values of model #2. For example, the values of the model parameter values of model #2 118-2 are adjusted to reduce the error between the two representations. The training process may end when the error meets a threshold, such as is less than a threshold.

At the end of the second phase, at 412, model trainer 116 outputs the model parameters for model #1 and model #2. The training process may be improved by separating model #1 and model #2. For example, the number of model parameters that needs to be trained may be reduced and the complexity of training the model may also be reduced because model #1 and model #2 may have simpler logic than a single model. Also, the training removes the model parameters that need to be trained from model #1 118-1 from the training process of model #2 118-2. This may allow the training to be performed faster because the logic for the models may be simpler when models are separated, and the training can converge to a desired result faster.

Conclusion

Accordingly, the reach representation may be estimated using an improved system. The structure of representation analysis system 114 may more efficiently generate the reach representation. Also, the representation generation may also be performed faster because each model may have simpler logic that can be executed faster separately as compared to when combined, such as the adjustment of the parameters may be performed with modification factors.

System

Figure 5:
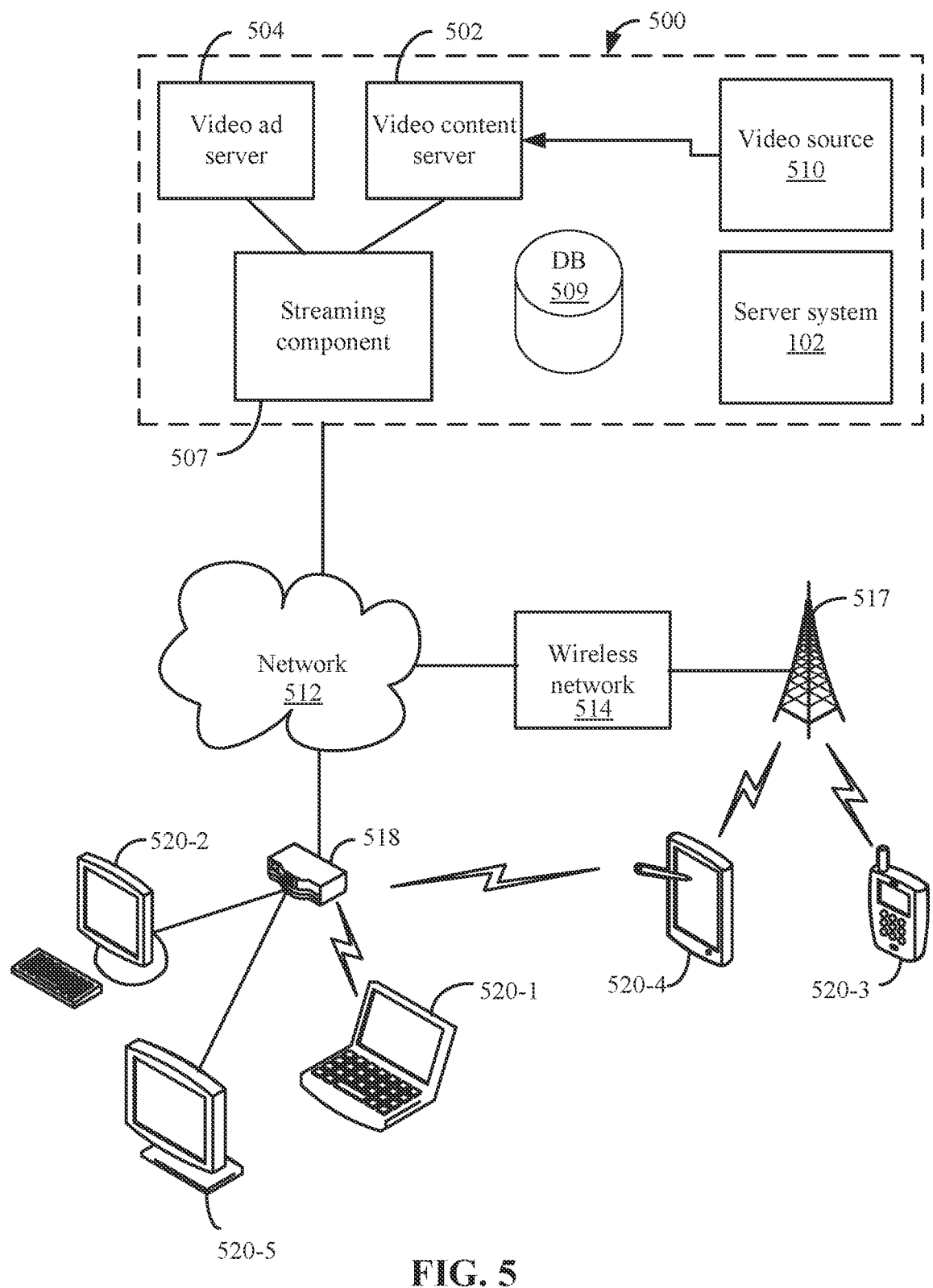
FIG. 5 depicts a video streaming system in communication with multiple client devices via one or more communication networks according to one embodiment.

Features and aspects as disclosed herein may be implemented in conjunction with a video streaming system 500 in communication with multiple client devices via one or more communication networks as shown in FIG. 5. Aspects of the video streaming system 500 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 500, video data may be obtained from one or more sources for example, from a video source 510, for use as input to a video content server 502. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 500 may include one or more computer servers or modules 502, 504, and/or 507 distributed over one or more computers. Each server 502, 504, 507 may include, or may be operatively coupled to, one or more data stores 509, for example databases, indexes, files, or other data structures. A video content server 502 may access a data store (not shown) of various video segments. The video content server 502 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 504 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 500, a public service message, or some other information. The video advertising server 504 may serve the video advertising segments as directed by a user interface controller (not shown).

The video streaming system 500 also may include server system 102.

The video streaming system 500 may further include an integration and streaming component 507 that integrates video content and video advertising into a streaming video segment. For example, streaming component 507 may be a content server or streaming media server. A controller (not shown) may determine the selection or configuration of advertising in the streaming video based on any suitable algorithm or process. The video streaming system 500 may include other modules or units not depicted in FIG. 5, for example, administrative servers, commerce servers, network infrastructure, advertising selection engines, and so forth.

The video streaming system 500 may connect to a data communication network 512. A data communication network 512 may comprise a local area network (LAN), a wide area network (WAN), for example, the Internet, a telephone network, a wireless cellular telecommunications network (WCS) 514, or some combination of these or similar networks.

One or more client devices 520 may be in communication with the video streaming system 500, via the data communication network 512, wireless cellular telecommunications network 514, and/or another network. Such client devices may include, for example, one or more laptop computers 520-1, desktop computers 520-2, "smart" mobile phones 520-3, tablet devices 520-4, network-enabled televisions 520-5, or combinations thereof, via a router 518 for a LAN, via a base station 517 for a wireless cellular telecommunications network 514, or via some other connection. In operation, such client devices 520 may send and receive data or instructions to the system 500, in response to user input received from user input devices or other input. In response, the system 500 may serve video segments and metadata from the data store 509 responsive to selection of media programs to the client devices 520. Client devices 520 may output the video content from the streaming video segment in a media player using a display screen, projector, or other video output device, and receive user input for interacting with the video content.

Distribution of audio-video data may be implemented from streaming component 507 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 507 may communicate with client device 520 using control messages and data messages to adjust to changing network conditions as the video is played. These control messages can include commands for enabling control functions such as fast forward, fast reverse, pausing, or seeking to a particular part of the file at the client.

Since streaming component 507 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 507 may use TCP-based protocols, such as HyperText Transfer Protocol (HTTP) and Real Time Messaging Protocol (RTMP). Streaming component 507 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 6:
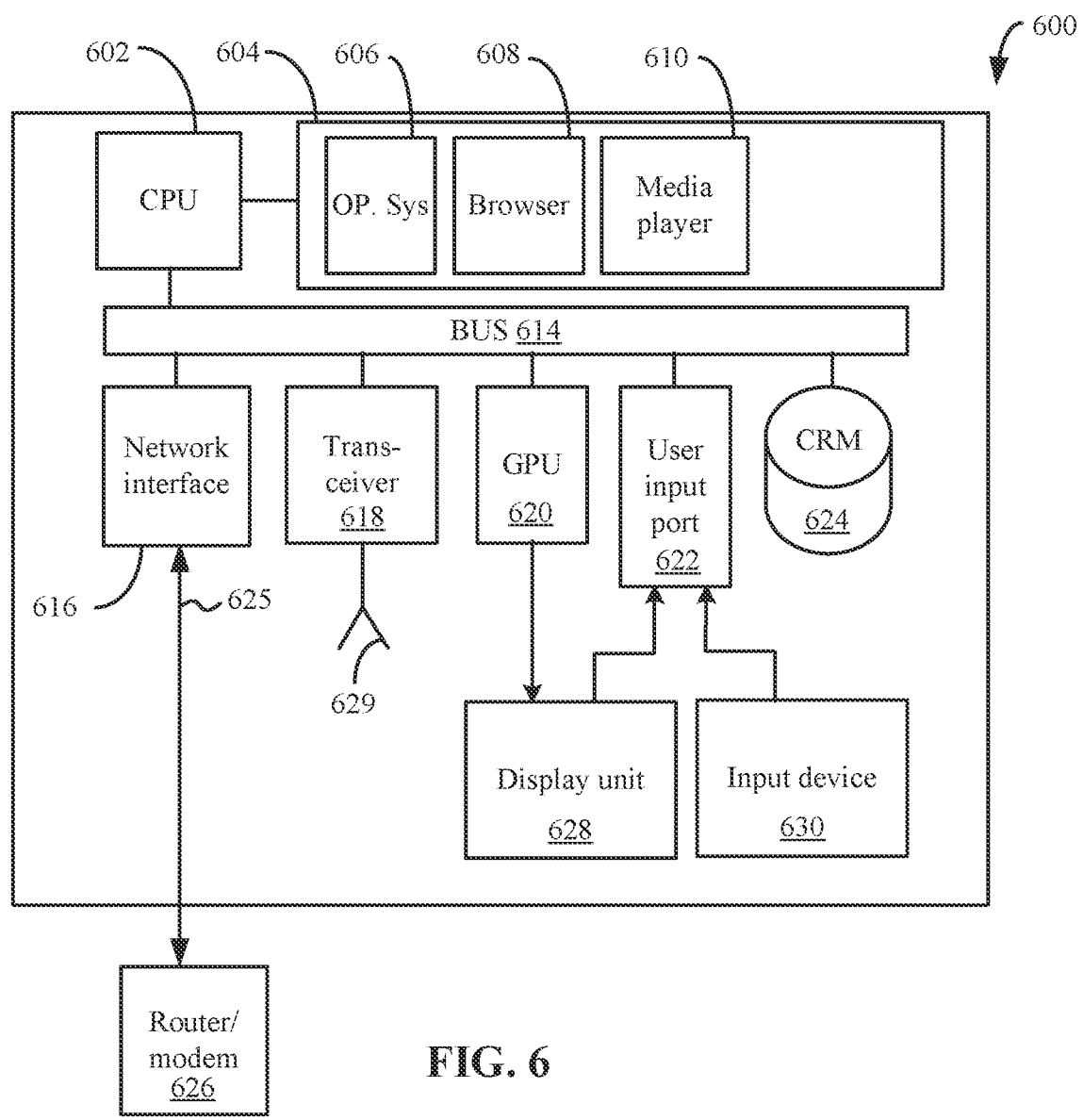
FIG. 6 depicts a diagrammatic view of an apparatus for viewing video content and advertisements.

Referring to FIG. 6, a diagrammatic view of an apparatus 600 for viewing video content and advertisements is illustrated. In selected embodiments, the apparatus 600 may include a processor (CPU) 602 operatively coupled to a processor memory 604, which holds binary-coded functional modules for execution by the processor 602. Such functional modules may include an operating system 606 for handling system functions such as input/output and memory access, a browser 608 to display web pages, and media player 610 for playing video. The memory 604 may hold additional modules not shown in FIG. 6, for example modules for performing other operations described elsewhere herein.

A bus 614 or other communication component may support communication of information within the apparatus 600. The processor 602 may be a specialized or dedicated microprocessor configured or operable to perform particular tasks in accordance with the features and aspects disclosed herein by executing machine-readable software code defining the particular tasks. Processor memory 604 (e.g., random access memory (RAM) or other dynamic storage device) may be connected to the bus 614 or directly to the processor 602, and store information and instructions to be executed by a processor 602. The memory 604 may also store temporary variables or other intermediate information during execution of such instructions.

A computer-readable medium in a storage device 624 may be connected to the bus 614 and store static information and instructions for the processor 602; for example, the storage device (CRM) 624 may store the modules 606, 608, 610 and 612 when the apparatus 600 is powered off, from which the modules may be loaded into the processor memory 604 when the apparatus 600 is powered up. The storage device 624 may include a non-transitory computer-readable storage medium holding information, instructions, or some combination thereof, for example instructions that when executed by the processor 602, cause the apparatus 600 to be configured or operable to perform one or more operations of a method as described herein.

A communication interface 616 may also be connected to the bus 614. The communication interface 616 may provide or support two-way data communication between the apparatus 600 and one or more external devices, e.g., the streaming system 500, optionally via a router/modem 626 and a wired or wireless connection. In the alternative, or in addition, the apparatus 600 may include a transceiver 618 connected to an antenna 629, through which the apparatus 600 may communicate wirelessly with a base station for a wireless communication system or with the router/modem 626. In the alternative, the apparatus 600 may communicate with a video streaming system 500 via a local area network, virtual private network, or other network. In another alternative, the apparatus 600 may be incorporated as a module or component of the system 500 and communicate with other components via the bus 614 or by some other modality.

The apparatus 600 may be connected (e.g., via the bus 614 and graphics processing unit 620) to a display unit 628. A display 628 may include any suitable configuration for displaying information to an operator of the apparatus 600. For example, a display 628 may include or utilize a liquid crystal display (LCD), touchscreen LCD (e.g., capacitive display), light emitting diode (LED) display, projector, or other display device to present information to a user of the apparatus 600 in a visual display.

One or more input devices 630 (e.g., an alphanumeric keyboard, microphone, keypad, remote controller, game controller, camera, or camera array) may be connected to the bus 614 via a user input port 622 to communicate information and commands to the apparatus 600. In selected embodiments, an input device 630 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 628, for example using a touch sensitive screen. A cursor control device may communicate direction information and command selections to the processor 602 and control cursor movement on the display 628. A cursor control device may have two or more degrees of freedom, for example allowing the device to specify cursor positions in a plane or three-dimensional space.

EXAMPLE EMBODIMENTS

In some embodiments, a method comprising: receiving, by a computing device, a line item factor for a line item at a first model, wherein the line item factor is used to select an instance of supplemental content for the line item for delivery; receiving, by the computing device, a competition factor at a second model, wherein the competition factor is based on competition to select instances of supplemental content for the line item and other line items; generating, by the computing device with the first model, a first value for a representation parameter based on the line item factor, wherein the representation parameter is used to generate a representation for estimating selection of the instance of supplemental content for the line item for delivery; generating, by the computing device with the second model, a modification factor based on the competition factor, wherein the modification factor is configured to modify the first value for the representation parameter based on competition from other line items to select the instance of supplemental content for the line item for delivery; and modifying, by the computing device, the first value for the representation parameter using the modification factor to generate a second value for the representation parameter, wherein the second value is used to generate the representation.

In some embodiments, the representation value comprises a first representation value and the modification factor comprises a first modification factor, the method further comprising: generating a third value for a second representation parameter; generating a second modification factor; and modifying the third value for the second representation parameter using the second modification factor to generate a fourth value for the second representation parameter.

In some embodiments, the representation is generated using the second value and the fourth value.

In some embodiments, the representation is generated without using information for selecting instances of supplemental content for the line item for delivery.

In some embodiments, the method further comprising: generating the representation using the second value instead of using the first value.

In some embodiments, the method further comprising: in a first phase, training the first model to determine first model parameter value for the first model; and in a second phase, training the second model to determine second model parameter value for the second model.

In some embodiments, in the first phase, an output of the second model is fixed to train the first model parameter value of the first model.

In some embodiments, the representation comprises a first representation, and wherein training the first model comprises: determining a second representation that is known from the line item factor and the competition factor; comparing the first representation to the second representation; and adjusting the first model parameter value based on the comparing.

In some embodiments, continuing to adjust the first model parameter value while the output of the second model is fixed until a threshold of a difference between the first representation and the second representation is reached.

In some embodiments, in the second phase, the first model parameter value is fixed to train the second model parameter value of the second model.

In some embodiments, the representation comprises a first representation, and wherein training the first model comprises: determining a second representation that is known from the line item factor and the competition factor; comparing the first representation to the second representation; and adjusting the second model parameter value based on the comparing.

In some embodiments, continuing to adjust the second model parameter value while the first model parameter value is fixed until a threshold of a difference between the first representation and the second representation is reached.

In some embodiments, the representation is based on a relationship of the selection of the instance of supplemental content for the line item for delivery and a number of user accounts in which the delivery of the instance of supplemental content for the line item reaches.

In some embodiments, the competition factor is based on historical delivery of instances of supplemental content for line items other than the line item.

In some embodiments, modifying the first value for the representation parameter comprises: multiplying the modification factor to the first value for the representation parameter to adjust the first value to the second value.

In some embodiments, the first model generates the first value separately from the second model generating the modification factor.

In some embodiments, a non-transitory computer-readable storage medium containing instructions, that when executed, control a computer system to be operable for:
  receiving a line item factor for a line item at a first model, wherein the line item factor is used to select an instance of supplemental content for the line item for delivery; receiving a competition factor at a second model, wherein the competition factor is based on competition to select instances of supplemental content for the line item and other line items; generating, with the first model, a first value for a representation parameter based on the line item factor, wherein the representation parameter is used to generate a representation for estimating selection of the instance of supplemental content for the line item for delivery; generating, with the second model, a modification factor based on the competition factor, wherein the modification factor is configured to modify the first value for the representation parameter based on competition from other line items to select the instance of supplemental content for the line item for delivery; and modifying the first value for the representation parameter using the modification factor to generate a second value for the representation parameter, wherein the second value is used to generate the representation.

In some embodiments, the representation value comprises a first representation value and the modification factor comprises a first modification factor, further operable for: generating a third value for a second representation parameter; generating a second modification factor; and modifying the third value for the second representation parameter using the second modification factor to generate a fourth value for the second representation parameter.

In some embodiments, further operable for: in a first phase, training the first model to determine first model parameter value for the first model; and in a second phase, training the second model to determine second model parameter value for the second model.

In some embodiments, an apparatus comprising: one or more computer processors; and a non-transitory computer-readable storage medium comprising instructions, that when executed, control the one or more computer processors to be operable for: receiving a line item factor for a line item at a first model, wherein the line item factor is used to select an instance of supplemental content for the line item for delivery; receiving a competition factor at a second model, wherein the competition factor is based on competition to select instances of supplemental content for the line item and other line items; generating, with the first model, a first value for a representation parameter based on the line item factor, wherein the representation parameter is used to generate a representation for estimating selection of the instance of supplemental content for the line item for delivery; generating, with the second model, a modification factor based on the competition factor, wherein the modification factor is configured to modify the first value for the representation parameter based on competition from other line items to select the instance of supplemental content for the line item for delivery; and modifying the first value for the representation parameter using the modification factor to generate a second value for the representation parameter, wherein the second value is used to generate the representation.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
  causing delivery of instances of main content from a content server to client devices;
  causing delivery of instances of line items via a supplemental content server to client devices during breaks in the main content;
  receiving, in a data store, training data based on the delivery of the instances of line items, wherein the training data includes line item factors for line items and competition factors for the line items;
  in a first phase, training, using the line item factors in the training data, a first model to determine a first model parameter value for the first model while an output of the second model is fixed;
  in a second phase, training, using the competition factors in the training data, a second model to determine a second model parameter value for the second model while the first model parameter value is fixed;
  receiving, by a computing device, a line item factor for a line item at the first model, wherein the line item factor is used to select an instance of supplemental content for the line item for delivery;
  receiving, by the computing device, a competition factor at the second model, wherein the competition factor is based on competition to select instances of supplemental content for the line item and other line items, wherein first logic for the first model is separate from second logic for the second model;
  generating, by the computing device with the first model, a first value for a representation parameter based on the line item factor using the first model parameter value, wherein the representation parameter is used to generate a representation for estimating selection of the instance of supplemental content for the line item for delivery;

generating, by the computing device with the second model, a modification factor based on the competition factor using the second model parameter value, wherein the modification factor is configured to modify the first value for the representation parameter based on competition from other line items to select the instance of supplemental content for the line item for delivery;

modifying, by the computing device, the first value for the representation parameter using the modification factor to generate a second value for the representation parameter; and generating, by the computing device, the representation using the second value and not the first value.

2. The method of claim 1, wherein the representation value comprises a first representation value and the modification factor comprises a first modification factor, the method further comprising:

generating a third value for a second representation parameter;

generating a second modification factor; and modifying the third value for the second representation parameter using the second modification factor to generate a fourth value for the second representation parameter.

3. The method of claim 2, wherein the representation is generated using the second value and the fourth value.

4. The method of claim 1, wherein the representation is generated without using information for selecting instances of supplemental content for the line item for delivery.

5. The method of claim 1, wherein the representation comprises a first representation, and wherein training the first model comprises:

determining a second representation that is known from the line item factor and the competition factor;

comparing the first representation to the second representation; and adjusting the first model parameter value based on the comparing.

6. The method of claim 5, wherein:

continuing to adjust the first model parameter value while the output of the second model is fixed until a threshold of a difference between the first representation and the second representation is reached.

7. The method of claim 1, wherein the representation comprises a first representation, and wherein training the first model comprises:

determining a second representation that is known from the line item factor and the competition factor;

comparing the first representation to the second representation; and adjusting the second model parameter value based on the comparing.

8. The method of claim 7, wherein:

continuing to adjust the second model parameter value while the first model parameter value is fixed until a threshold of a difference between the first representation and the second representation is reached.

9. The method of claim 1, wherein the representation is based on a relationship of the selection of the instance of supplemental content for the line item for delivery and a number of user accounts in which the delivery of the instance of supplemental content for the line item reaches.

10. The method of claim 1, wherein the competition factor is based on historical delivery of instances of supplemental content for line items other than the line item.

11. The method of claim 1, wherein modifying the first value for the representation parameter comprises:

multiplying the modification factor to the first value for the representation parameter to adjust the first value to the second value.

12. The method of claim 1, wherein the first model generates the first value separately from the second model generating the modification factor.

13. A non-transitory computer-readable storage medium containing instructions, that when executed, control a computer system to be operable for:

causing delivery of instances of main content from a content server to client devices;

causing delivery of instances of line items via a supplemental content server to client devices during breaks in the main content;

receiving, in a data store, training data based on the delivery of the instances of line items, wherein the training data includes line item factors for line items and competition factors for the line items;

in a first phase, training, using the line item factors in the training data, a first model to determine a first model parameter value for the first model while an output of the second model is fixed;

in a second phase, training, using the competition factors in the training data, a second model to determine a second model parameter value for the second model while the first model parameter value is fixed;

receiving a line item factor for a line item at the first model, wherein the line item factor is used to select an instance of supplemental content for the line item for delivery;

receiving a competition factor at the second model, wherein the competition factor is based on competition to select instances of supplemental content for the line item and other line items, wherein first logic for the first model is separate from second logic for the second model;

generating, with the first model, a first value for a representation parameter based on the line item factor using the first model parameter value, wherein the representation parameter is used to generate a representation for estimating selection of the instance of supplemental content for the line item for delivery;

generating, with the second model, a modification factor based on the competition factor using the second model parameter value, wherein the modification factor is configured to modify the first value for the representation parameter based on competition from other line items to select the instance of supplemental content for the line item for delivery;

modifying the first value for the representation parameter using the modification factor to generate a second value for the representation parameter; and generating the representation using the second value and not the first value.

14. The non-transitory computer-readable storage medium of claim 13, wherein the representation value comprises a first representation value and the modification factor comprises a first modification factor, further operable for:

generating a third value for a second representation parameter;

generating a second modification factor; and modifying the third value for the second representation parameter using the second modification factor to generate a fourth value for the second representation parameter.

15. An apparatus comprising:
one or more computer processors; and
a non-transitory computer-readable storage medium comprising instructions, that when executed, control the one or more computer processors to be operable for:
causing delivery of instances of main content from a content server to client devices;
causing delivery of instances of line items via a supplemental content server to client devices during breaks in the main content;
receiving, in a data store, training data based on the delivery of the instances of line items, wherein the training data includes line item factors for line items and competition factors for the line items;
in a first phase, training, using the line item factors in the training data, a first model to determine a first model parameter value for the first model while an output of the second model is fixed;
in a second phase, training, using the competition factors in the training data, a second model to determine a second model parameter value for the second model while the first model parameter value is fixed;
receiving a line item factor for a line item at the first model, wherein the line item factor is used to select an instance of supplemental content for the line item for delivery;
receiving a competition factor at the second model, wherein the competition factor is based on competition to select instances of supplemental content for the line item and other line items, wherein first logic for the first model is separate from second logic for the second model;
generating, with the first model, a first value for a representation parameter based on the line item factor using the first model parameter value, wherein the representation parameter is used to generate a representation for estimating selection of the instance of supplemental content for the line item for delivery;
generating, with the second model, a modification factor based on the competition factor using the second model parameter value, wherein the modification factor is configured to modify the first value for the representation parameter based on competition from other line items to select the instance of supplemental content for the line item for delivery;
modifying the first value for the representation parameter using the modification factor to generate a second value for the representation parameter; and
generating the representation using the second value and not the first value.

16. The method of claim 1, wherein:
the first logic generates the first value for a representation parameter, and the second logic generates the modification factor based on the competition factor.

17. The non-transitory computer-readable storage medium of claim 13, wherein the representation is generated without using information for selecting instances of supplemental content for the line item for delivery.

18. The non-transitory computer-readable storage medium of claim 13, wherein the representation comprises a first representation, and wherein training the first model comprises:
determining a second representation that is known from the line item factor and the competition factor;
comparing the first representation to the second representation; and
adjusting the first model parameter value based on the comparing.

19. The non-transitory computer-readable storage medium of claim 18, wherein:
continuing to adjust the first model parameter value while the output of the second model is fixed until a threshold of a difference between the first representation and the second representation is reached.

20. The non-transitory computer-readable storage medium of claim 13, wherein the representation comprises a first representation, and wherein training the first model comprises:
determining a second representation that is known from the line item factor and the competition factor;
comparing the first representation to the second representation; and
adjusting the second model parameter value based on the comparing.

* * * * *